(12) United States Patent
Kapustin et al.

(10) Patent No.: US 8,010,774 B2
(45) Date of Patent: Aug. 30, 2011

(54) BREAKPOINTING ON REGISTER ACCESS EVENTS OR I/O PORT ACCESS EVENTS

(75) Inventors: Andrei Kapustin, Cambridge (GB);
Yuri Ledvik, Cambridge (GB);
Vladimir Vasekin, Cambridge (GB)

(73) Assignee: ARM Limited, Cambridge (GB)

( * ) Notice: Subject to any disclaimer, the term of this patent is extended or adjusted under 35 U.S.C. 154(b) by 828 days.

(21) Appl. No.: 11/592,323

(22) Filed: Nov. 3, 2006

(65) Prior Publication Data

US 2007/0226473 A1 Sep. 27, 2007

Related U.S. Application Data

(63) Continuation-in-part of application No. 11/373,514, filed on Mar. 13, 2006, now abandoned.

(51) Int. Cl.
*G06F 15/177* (2006.01)

(52) U.S. Cl. .............................. 712/227; 714/34; 714/35

(58) Field of Classification Search .................. 712/227; 714/34, 35
See application file for complete search history.

(56) References Cited

U.S. PATENT DOCUMENTS

| | | | |
|---|---|---|---|
| 4,176,394 A | 11/1979 | Kaminski et al. | |
| 4,879,646 A | 11/1989 | Iwasaki et al. | |
| 5,199,064 A * | 3/1993 | Gulick et al. | 379/387.02 |
| 5,239,642 A * | 8/1993 | Gutierrez et al. | 711/207 |
| 5,298,921 A * | 3/1994 | Gulick | 710/106 |
| 5,319,763 A * | 6/1994 | Ho et al. | 714/34 |
| 5,341,500 A * | 8/1994 | Moyer et al. | 710/200 |
| 5,560,036 A * | 9/1996 | Yoshida | 712/227 |
| 5,574,927 A * | 11/1996 | Scantlin | 712/41 |
| 5,655,115 A | 8/1997 | Shen et al. | |
| 5,664,159 A * | 9/1997 | Richter et al. | 703/23 |
| 5,673,408 A | 9/1997 | Shebanow et al. | |
| 5,680,620 A * | 10/1997 | Ross | 717/129 |
| 5,704,034 A * | 12/1997 | Circello | 714/38 |
| 5,737,516 A * | 4/1998 | Circello et al. | 714/38 |
| 5,964,893 A * | 10/1999 | Circello et al. | 714/39 |
| 6,026,501 A * | 2/2000 | Hohl et al. | 714/38 |
| 6,035,422 A * | 3/2000 | Hohl et al. | 714/35 |
| 6,052,774 A * | 4/2000 | Segars et al. | 712/200 |
| 6,075,941 A * | 6/2000 | Itoh et al. | 717/128 |
| 6,321,329 B1 * | 11/2001 | Jaggar et al. | 712/227 |
| 6,343,358 B1 * | 1/2002 | Jaggar et al. | 712/227 |
| 6,446,221 B1 * | 9/2002 | Jaggar et al. | 714/30 |
| 6,598,178 B1 * | 7/2003 | Yee et al. | 714/34 |
| 6,606,695 B2 * | 8/2003 | Kamano et al. | 711/163 |
| 6,681,280 B1 * | 1/2004 | Miyake et al. | 710/261 |
| 6,708,326 B1 * | 3/2004 | Bhattacarya | 717/124 |
| 6,915,416 B2 * | 7/2005 | Deng et al. | 712/227 |

(Continued)

OTHER PUBLICATIONS

Wiley Publishing, Inc., "register." Webster's New World™ Computer Dictionary, 2003.*

(Continued)

*Primary Examiner* — Aimee Li (74) *Attorney, Agent, or Firm* — Nixon & Vanderhye P.C.

(57) ABSTRACT

A data processing system is provided with breakpoint circuitry having breakpoint registers which can specify a variety of different types of breakpoint conditions. These breakpoint conditions include register access breakpoints which are triggered when an access is made to either a general purpose register or a configuration register. The breakpoints can also include input/output port access breakpoints which are triggered when an access is made to a predetermined one of a plurality of input/output ports by an appropriate program instruction or in another way.

34 Claims, 4 Drawing Sheets

U.S. PATENT DOCUMENTS

| | | | | |
|---|---|---|---|---|
| 6,968,434 | B2* | 11/2005 | Kamano et al. | 711/163 |
| 7,051,182 | B2* | 5/2006 | Blumenau et al. | 711/202 |
| 7,130,978 | B2* | 10/2006 | Kamano et al. | 711/163 |
| 7,581,090 | B2* | 8/2009 | Miyake et al. | 712/244 |
| 2001/0047463 | A1* | 11/2001 | Kamano et al. | 711/163 |
| 2001/0056353 | A1* | 12/2001 | Li et al. | 704/502 |
| 2003/0037225 | A1* | 2/2003 | Deng et al. | 712/227 |
| 2004/0040013 | A1* | 2/2004 | Kalra | 717/129 |
| 2004/0054866 | A1* | 3/2004 | Blumenau et al. | 711/202 |
| 2004/0088462 | A1* | 5/2004 | Miyake et al. | 710/261 |
| 2004/0117605 | A1 | 6/2004 | Ahmad et al. | |
| 2004/0170046 | A1 | 9/2004 | Belnet et al. | |
| 2004/0199736 | A1* | 10/2004 | Kamano et al. | 711/163 |
| 2005/0188119 | A1* | 8/2005 | Hayden | 710/22 |
| 2006/0174163 | A1* | 8/2006 | Gravoille et al. | 714/38 |
| 2006/0271753 | A1* | 11/2006 | Kamano et al. | 711/163 |

OTHER PUBLICATIONS

"Register," Free On-ling Dictionary of Computing (FOLDOC), www.foldoc.org.*

Hennessy, John L. and Patterson, David A. "Computer Architecture a Quantitative Approach". © 1996. Morgan Kaufmann Publishers, Inc. Second Edition. pp. 68-123.*

Peacock, Craig. "Interfacing the Standard Parallel Port". © Feb. 1998. pp. 1-17. http://www.beyondlogic.org/spp/parallel.pdf.*

Free On-Line Dictionary of Computing. www.FOLDOC.org © 1996. search terms: Memory, Register.*

ARM920T, Technical Reference Manual, Rev. 1, 2000, 2001, ARM Limited, pp. 9-1 to 9-68.

R.K. Kolagotla et al, "High Performance Dual-MAC DSP Arechitecture" IEEE Signal Processing Magazine, vol. 19, Iss. 4, Jul. 2002, pp. 42-53.

ARM Agilent Debut Interface User Guide, Version 1.0, 2001, ARM Limited.

U.S. Appl. No. 11/373,514, filed Mar. 13, 2006; Inventor: Kapustin et al.

* cited by examiner

BREAKPOINTING ON REGISTER ACCESS EVENTS OR I/O PORT ACCESS EVENTS

This application is a Continuation-In-Part of U.S. application Ser. No. 11/373,514 filed 13 Mar. 2006 now abandoned. The entire contents of these applications are incorporated herein by reference.

This invention relates to the field of data processing systems. More particularly, this invention relates to breakpointing mechanisms used within data processing systems.

BACKGROUND

It is known to provide breakpointing mechanisms to assist in the analysis and debugging of data processing systems. With the advent of increasingly the complex data processing systems, and program code executing on such data processing systems, the provision of diagnostic/analytical mechanisms, such as breakpointing mechanisms and trace mechanisms, has becoming increasingly important to assist in the rapid and efficient development of hardware and software.

It is known to provide tracing mechanisms which output trace data indicative of a stream of data processing operations being performed. It is also known to provide breakpointing mechanisms which, when a breakpoint condition arises during program execution, trigger a breakpoint response.

One type of known breakpoint mechanism is to insert breakpoint instructions within the program flow. When these breakpoint instructions are encountered, they redirect processing to a breakpoint handler. The state of the system at that breakpoint can then be investigated and this information used for diagnostic/analytical purposes. A disadvantage with inserting breakpoint instructions is that they necessarily disturb the normal operation of the program code and it is difficult to select where to insert those breakpoint instructions to help analyse/diagnose a problem which may be arising. In program code that may be many thousands or tens of thousands of instructions in length, identifying the points at which it is appropriate to insert breakpoint instructions can be a difficult task.

Another known type of breakpointing mechanism relies upon identifying memory accesses with particular characteristics. The breakpointing mechanisms provided by the ARM7TDMI processor of ARM Limited, Cambridge, England include address and data watchpoints. Using these mechanisms, a breakpointing circuit can be programmed to trigger a breakpoint response when a memory access occurs to a memory address having a predetermined characteristic or to a data value with a predetermined characteristic. Whilst these breakpointing techniques are useful and flexible, they do not provide convenient mechanisms for triggering breakpoints in all circumstances where this might be useful. Not all points at which it may be desired to trigger a breakpoint involve a memory access having characteristics which can be used to trigger either an address watchpoint or a data watchpoint using the known mechanisms.

SUMMARY OF THE INVENTION

Viewed from one aspect the present invention provides apparatus for processing data, said apparatus comprising:
one or more registers; and
breakpoint circuitry responsive to an access to at least one of said one or more registers to trigger a breakpoint response.

The inventors recognized that in many real life circumstances there is strong diagnostic/analytical merit in being able to trigger a breakpoint event in response to an access to a register within the data processing system. A register, which may be a general purpose register or a control register, can be storing a value which is subject to accesses important for diagnostic/analytical reasons, and yet which do not involve a memory access of the type which can be identified with address and data watchpoints. As an example, a general purpose register may be holding a frequently used variable and it is significant to know when that variable is accessed or changed. Without the present technique, the existing systems would require single-stepping through the program code trying to spot instructions which accessed the register concerned. Another approach would be to try to analyse the program instructions to be executed to identify those program instructions which access registers of interest. A problem with this approach is that a program instruction which is fetched and decoded may not actually be executed, e.g. due to interrupts, aborts etc, whereas other instructions which result in register accesses of interests may not be readily identifiable from the instruction itself (e.g. LDM load multiple instructions). The present technique addresses these problems by providing breakpoint circuitry which is responsive to the actual register accesses as they occur to trigger the breakpoint response. Whilst breakpoint mechanisms have traditionally been seen as a separate add-on part of a data processing system somewhat disconnected from the fine detail of the internal working of the data processing system and observing the data processing system from outside, surprisingly it involves comparatively little disturbance or intervention to provide register access breakpoints responsive to the register access events themselves, particularly in the context of synthesised designs.

Examples of the use of this technique include monitoring accesses to register stored variables as discussed above, monitoring register accesses made by operating system or other low-level code which is ill suited to software breakpointing, monitoring access to control registers which change the configuration of the data processing system in what can be significant respects, and the like.

It will be appreciated from the above that the registers for which accesses are monitored/detected can take a variety of different forms including general purpose registers and control registers storing configuration data controlling the configuration of the data processing apparatus.

The breakpoint circuitry may include one or more debug registers storing access characterising data to determine characteristics of accesses to a target register that will trigger a breakpoint response. The number of debug registers which need be provided can be held advantageously low since in practice it is highly unusual to want simultaneously to monitor a large number of different registers, and in any case directly monitoring register accesses is more efficient and requires fewer software breakpoints or watchpoints than would seeking to monitor all instructions which could access that register within what can be lengthy program code.

It will be appreciated that the register access characterising data can take a large variety of different forms, and include many different forms of characteristic. These can include an identifier of a target register, an identifier or one or more types of access to a target register (including one or more of a read access, a write access, a reset and any access), a mask value specifying bits within the target register for which accesses are monitored and an identifier for a breakpoint handler associated with the breakpoint response (different breakpoint handlers could be provided for different triggering events, or these could be partially or wholly combined).

It will be appreciated that the register access breakpointing of the present technique can be combined in a system with memory access breakpointing. In such systems, the debug registers may be shared and either used to specify memory access breakpoints or register access breakpoints depending upon a control flag.

Viewed from another aspect the present invention provides apparatus for processing data, said apparatus comprising:
one or more input/output ports; and
breakpoint circuitry responsive to an access to at least one of said one or more input/output ports to trigger a breakpoint response.

Whilst the present techniques have been described above in relation to register access breakpointing, it will be appreciated that the same insights and techniques may be used to provide breakpoints triggered by accesses to input/output ports. In systems supporting input/output ports this provides the ability to trigger a breakpoint response following an access having predetermined characteristics to an input/output port in a way which might not be possible or might be highly inconvenient to provide using traditional memory access breakpointing.

The breakpoint circuitry providing input/output port access breakpointing can also use debug registers to specify characteristics of those input/output port accesses which are to trigger a breakpoint response. These characteristics can include an input/output port identifier, an access type identifier and an identifier of a breakpoint handler to be used for input/output port access breakpoints.

The debug registers within the breakpoint circuitry can be used to provide data characterising a register access breakpoint, an input/output port access breakpoint and/or a memory access breakpoint as desired and controlled by a control field within those debug registers.

Viewed from another aspect the present invention provides a method of triggering a breakpoint response within an apparatus for processing data having one or more registers, said method comprising the steps of:
detecting with breakpoint circuitry an access to at least one of said one or more registers; and
in response to detecting said access, triggering said breakpoint response.

Viewed from a further aspect the present invention provides a method of triggering a breakpoint response within an apparatus for processing data having one or more input/output ports, said method comprising the steps of:
detecting with breakpoint circuitry an access to at least one of said one or more input/output ports; and
in response to detecting said access, triggering said breakpoint response.

The above, and other objects, features and advantages will be apparent from the following detailed description of illustrative embodiments which is to be read in connection with the accompanying drawings.

DETAILED DESCRIPTION

Figure 1:
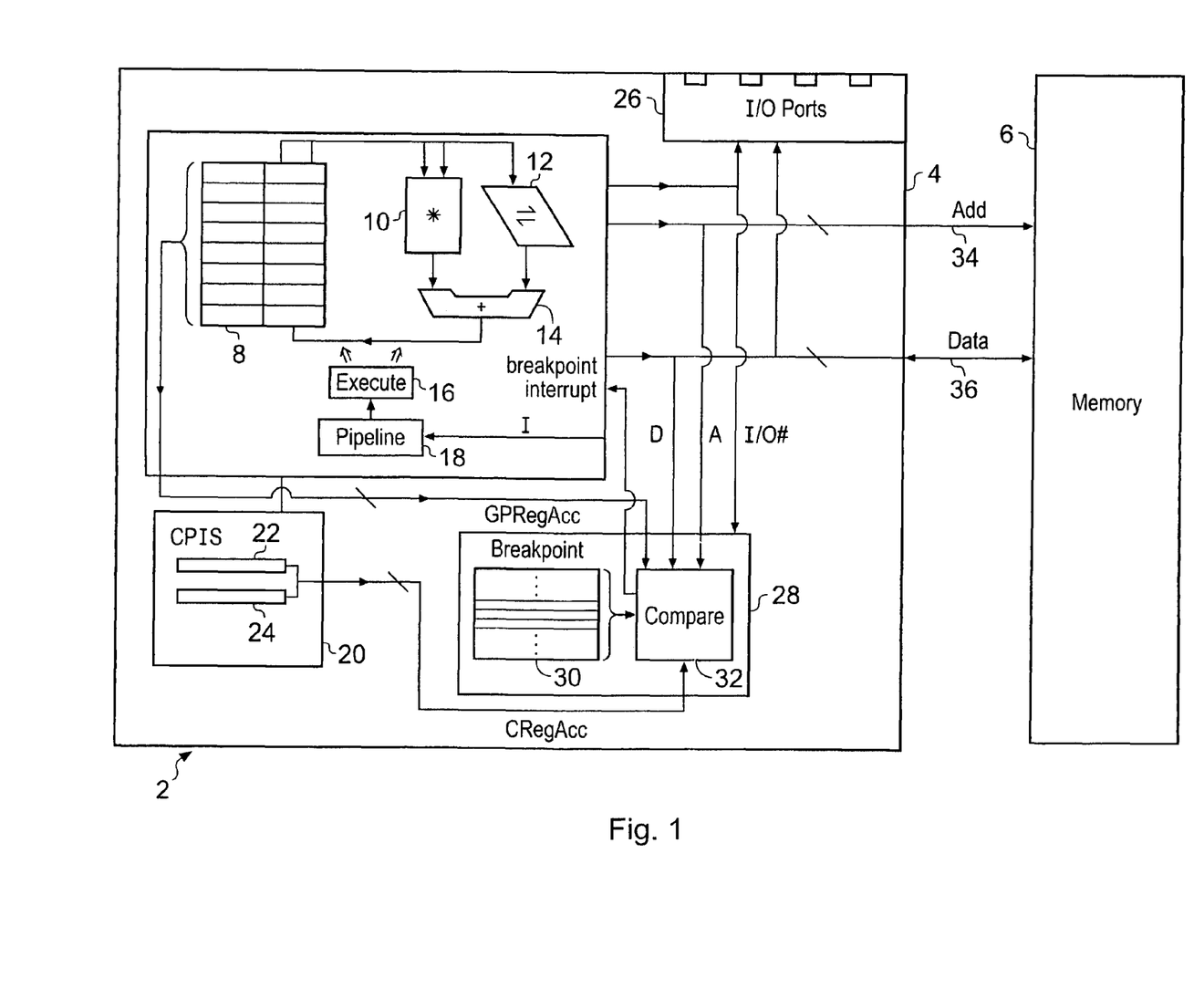
FIG. 1 schematically illustrates a data processing apparatus including breakpointing mechanisms.

FIG. 1 schematically illustrates a data processing apparatus 2 including a processor core 4 and a memory 6. It will be appreciated that the data processing apparatus 2 will typically include many other elements, but these have been omitted from FIG. 1 for the sake of clarity. The processor core 4 includes a data path having a register bank of general purpose registers 8, a multiplier 10, a shifter 12 and an adder 14. The general purpose registers 8, the multiplier 10, the shifter 12 and the adder 14 are controlled by control signals generated by decode and execute stages 16, which in turn are responsive to instructions within an instruction pipeline 18. This type of arrangement will be familiar to those in this technical field and an example of this type of arrangement is the ARM 7TDMI processor produced by ARM Limited of Cambridge, England.

The processor core 4 also includes a configuration coprocessor 20 including a number of configuration control registers 22, 24 storing configuration data for controlling the operation of the data processing system 2. As an example, the configuration registers 22, 24 may control whether an MMU (not illustrated) is or is not active, whether a cache memory (not illustrated) is or is not active, what processor mode (e.g. user, privileged etc) is current and many other aspects of the configuration of the data processing system 2. The processor core 4 further includes a plurality of input/output ports 26 which can be used for a variety of purposes, such as communicating with external buses and peripheral devices. Program instructions for writing data to and reading data from these I/O ports 26 are provided within the instruction set of the processor core 4. These I/O accessing instructions include a specifier of a particular I/O port being addressed together with a specifier as to whether or not the operation is a read or a write, and, if the operation is a write, then the data value to be written or at least a pointer to that data value.

Breakpoint circuitry 28 is provided within the processor core 4 and serves to generate a breakpoint interrupt and execution of breakpoint handling code when a breakpoint condition is recognised. The breakpoint conditions are characterised by data stored within debug registers 30 of the breakpoint circuitry 28. As will be described later, the debug registers can hold characterising data for breakpoints and are triggered by matching memory accesses, register accesses and/or I/O port accesses. The breakpoint interrupt supplied from the breakpoint circuitry 28 to the main portion of the processor core 4 serves to trigger invocation of a breakpoint handler, such as a breakpoint handling exception code. A single breakpoint handler can be provided for all the different types of breakpoint, or alternatively separate breakpoint handling code may be provided for one or more of the different types of breakpoints. The breakpoint circuitry 28 includes a comparator 32 which is responsive to the breakpoint characterising data from the debug registers 30, as well as signals collected from elsewhere within the processor core 4, characterising general purpose register accesses, configuration register accesses, data values being accessed, address values being accessed and input/output port identifiers. The comparator 32 uses this collected data to trigger a breakpoint response (breakpoint interrupt) when an appropriate match for a breakpoint condition is detected.

The breakpoint circuitry 28 described herein can additionally include breakpointing mechanisms responsive to characteristics of instructions being executed as is described in our co-pending application U.S. Ser. No. 11/373,514 filed 13 Mar. 2006 entitled "Data Processing Apparatus" and incorporated herein in its entirety by reference.

Memory access breakpointing within the system of FIG. 1 can be performed by the breakpoint circuitry 28 in the normal way by comparing address values on the address bus 34 and data values on the data bus 36 with stored characteristics of memory accesses within the debug registers 30. This behaviour can be in accordance with that known from systems such as the ARM7TDMI processor.

Figure 2:
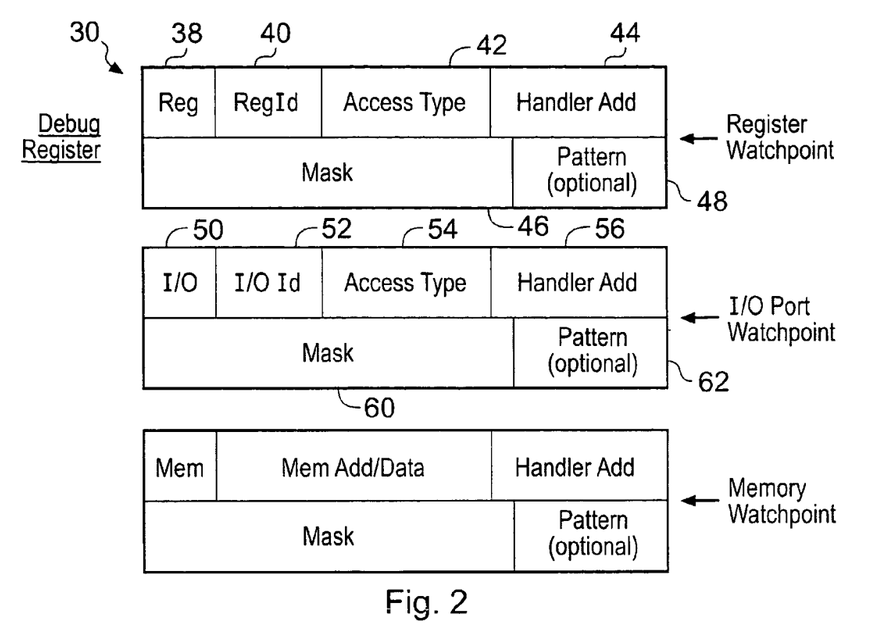
FIG. 2 schematically illustrates debug registers of various types within a breakpointing mechanism.

FIG. 2 illustrates three different types of watchpoint which can be established by appropriate programming of one of the debug registers 30. The first type of breakpoint is a register watchpoint whereby a register access is detected and triggers a breakpoint response. It will be appreciated that the register access is detected as it takes place (or at least within a period of time during which the register access is sure to take place). The debug register when specifying a register watchpoint includes a watchpoint type field 38 indicating that the debug register is holding data for a register watchpoint, a register identifying field 40 identifying the register for which accesses are being monitored by this register watchpoint, an access type field 42 specifying the types of access which will trigger the watchpoint for this debug register (e.g. writes, reads, resets and/or all accesses), a handler address field 44 specifying the address of interrupt handling code to be invoked if the register watchpoint concerned is triggered, a mask field 46 (optional) specifying a mask value to be used during some forms of watchpoint comparison as will be described later, a pattern field 48 (optional) storing a pattern value to be used as part of the register watchpoint comparison that may be performed as will be described later.

I/O port watchpoint characterising data for a debug register is illustrated and includes broadly similar fields as for the register watchpoint. In particular, a field 50 identifies the watchpoint as an I/O port watchpoint, am input/output port identifying field 52 specifies the input/output port number being subject to watchpointing, an access type filed 54 specifies whether the watchpointing is for reads, writes or both, an address handler field 56 specifies the memory address storing an interrupt handler to be invoked if the input/output port watchpoint is triggered, a mask field 60 and a pattern field 62 as above.

The debug register when storing characterising data for a memory watchpoint in this case holds data characterising the debug register as relating to a memory watchpoint, the memory address or data value being watched 4, the breakpoint handler address to be invoked, a mask value and a pattern value as appropriate. Control bits associated with a memory access (e.g. write, read or other control bits) may also be monitored and part of the watchpoint comparison for the memory access.

Figure 3:
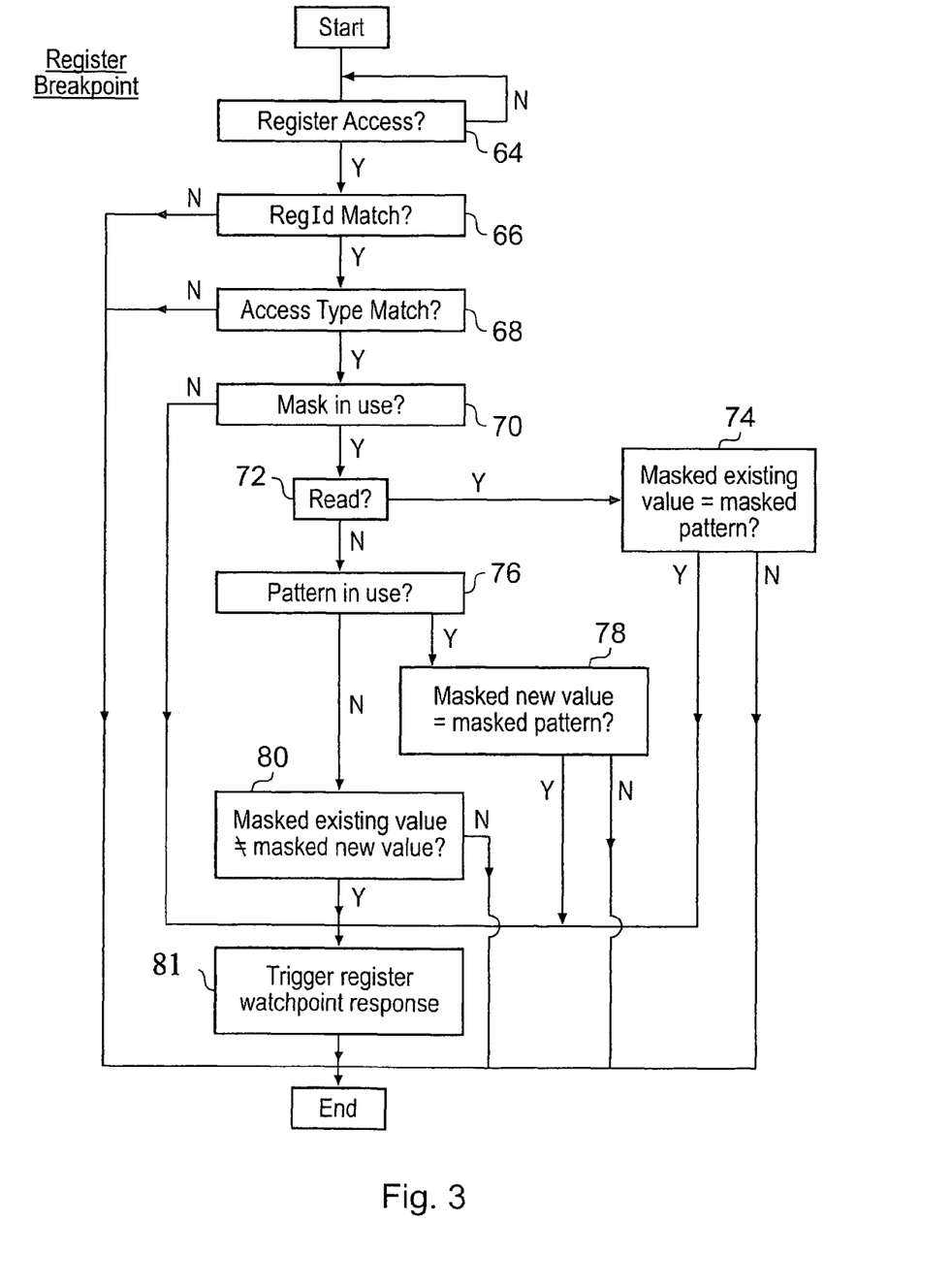
FIG. 3 is a flow diagram schematically illustrating the behaviour of the breakpointing mechanisms when performing register breakpointing.

FIG. 3 schematically illustrates a flow diagram of the processing performed by the breakpoint circuitry 28 when conducting register breakpointing. It will be appreciated that the flow diagram of FIG. 3 illustrates the operations performed as a sequence of discrete operations, whereas in practice when implemented in hardware many of these operations will be performed in parallel or in a different sequence depending upon the particular hardware implementation. Nevertheless, the flow diagram of FIG. 3 provides a representation of the processing being performed and can be used to generate a variety of hardware implementations performing the required processing.

Step 64 waits for a register access to be detected. Step 66 then determines whether or not the register access concerned matches the register identifier field 40 stored within any of the debug registers 30. If there is no match, then the processing terminates. If there is a match, then data processing proceeds to step 68 where for the matching debug register a determination is made as to whether or not the register access being made is of a type which matches the access type field 42 being watched for by that register watchpoint. If there is no match, then processing again terminates. If there is a match, then processing proceeds to step 70 at which it is determined whether or not the mask field 46 is currently in use for that register watchpoint. If the mask is not in use, then processing proceeds to step 81 where the register watchpoint response is triggered by raising a breakpoint interrupt and invoking register watchpoint handling code stored at an address indicated by the field 44. This breakpoint response will typically have a variety of actions, such as, for example, placing the data processing system 2 into a debug mode, stopping the clock or reducing the clock frequency to a level where communication with an external diagnostic apparatus is possible, or the like.

If the determination at step 70 was that the mask value is in use, then step 72 determines whether or not the access type is a read. If the access type is a read, then step 74 compares a value read from the register identified by the register identifier and masked with the mask value against a masked version of the pattern value stored for that register watchpoint. If the comparison indicates a match, then processing again proceeds to step 81 to trigger the register watchpoint response, otherwise the processing terminates.

If the determination at step 72 was that the access type was not a read, i.e. that the access was a write, then processing proceeds to step 76. Step 76 determines whether or not the pattern value is in use. If the pattern value is in use, then processing proceeds to step 78 at which a masked version of the new value being written to the register identified by the register ID is compared with a masked version of the pattern value. If the comparison indicates a match, then processing proceeds to step 72 at which the register watchpoint is again triggered. If the comparison at step 78 indicates no match, then processing terminates without triggering the watchpoint response.

If the determination at step 76 was that the pattern value is not in use, then this indicates a combination of factors, i.e. that the access type is a write, the mask is in use and the pattern is not in use. This is the combination of factors indicates a comparison is to be made as to whether or not the write being made to the register concerned is changing one or more bits within that register which are of interest. The bits of interest are identified by the mask. The comparison performed to effect this change detection at step 80 is to compare the masked existing value read from the register with a masked new value to be written to the register and to determine if they are not equal. If non-equality is detected, then the register watchpoint response is triggered at step 72. Otherwise, the processing terminates without triggering the register watchpoint response.

Figure 4:
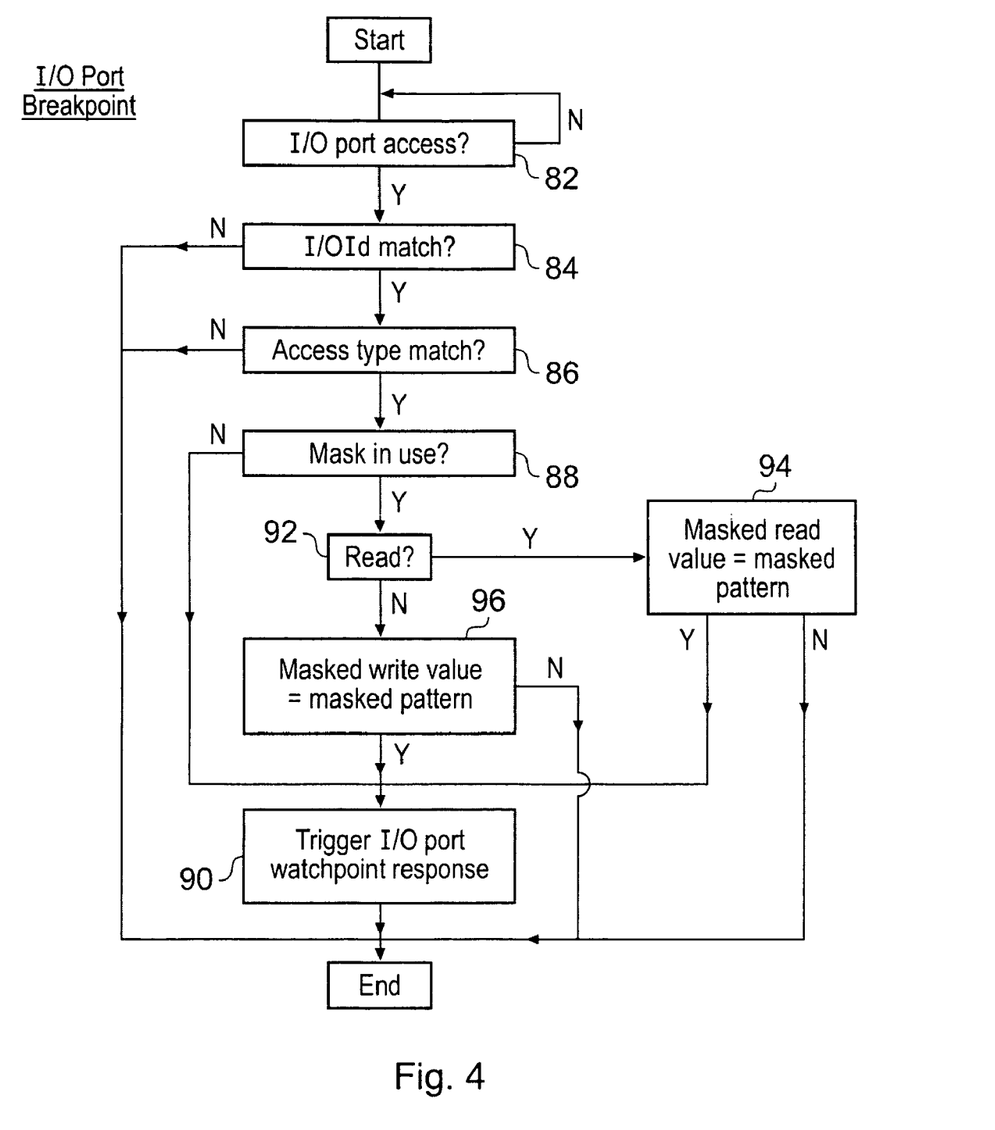
FIG. 4 is a flow diagram schematically illustrating the behaviour of the breakpointing mechanisms when performing I/O port breakpointing.

FIG. 4 is a flow diagram schematically illustrating input/output port watchpoint (breakpoint) processing in a similar manner to FIG. 3. At step 82, the processing waits for an input/output port access to be identified. Step 84 determines whether the input/output port identifier matches that stored within the field 52 for any of the input/output port watchpoints held within the debug registers 30. If there is no match with any of the debug registers, then processing terminates. If there is a match at step 84, then processing proceeds to step 86 where for the matching debug register a determination is made as to whether or not the access type field 54 for that debug register matches the currently occurring input/output port access. If there is no match, then processing terminates.

If there is a match at step 86, then processing proceeds to step 88 where a determination is made as to whether or not the masked value 60 is currently in use. If the mask value is not in use, then processing proceeds to step 90 where an input/output port watchpoint response is triggered. This response may be the same as the register access watchpoint response or may be different. The handler address 56 stored within the input/output port watchpoint data will specify the memory address where the code for the input/output port watchpoint response is located.

If the determination at step 88 is that the mask value is in use, then step 92 determines whether or not the access detected at step 82 is a read. If the access is a read, then step 94 compares the read value read from the input/output port concerned and subject to masking with the mask value 60 against a masked version of the pattern value 62 (masked with the same mask 60). If the comparison at step 94 indicates a match, then processing proceeds to step 90 where in the input/output port watched by the watchpoint response is triggered. If there is no match at step 74, then processing terminates without a watchpoint response being triggered.

If the determination at step 92 was that the access is not a read, then processing proceeds to step 96. Step 96 compares the value being written to the input/output port concerned (as identified by the identifier field 52) and subject to masking by the mask value 60 against a masked version of the pattern value 62. If a match occurs, then the input/output port watchpoint response is triggered at step 90. If there is no match at step 96, then processing is again terminated without an input/output watchpoint response being triggered.

Figure 5:
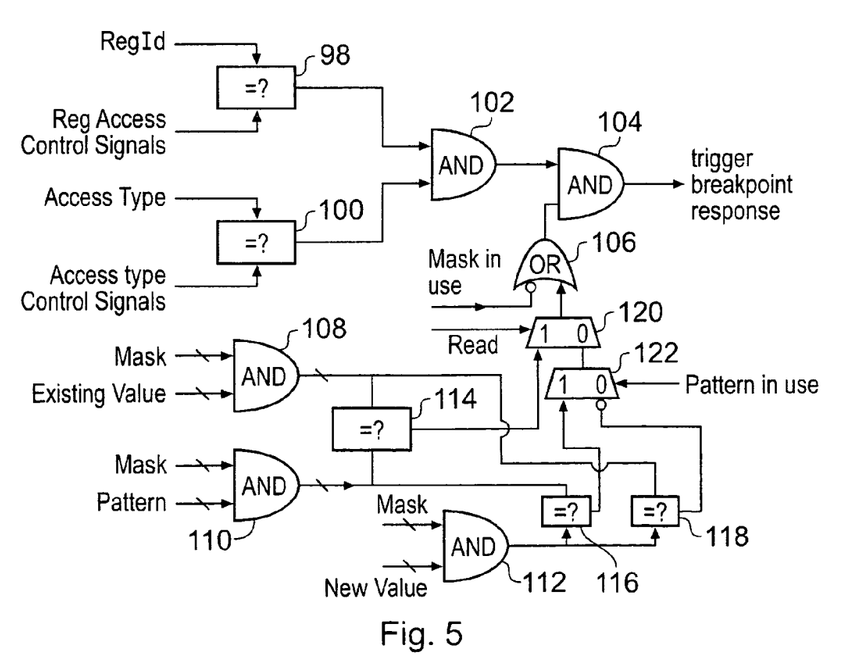
FIG. 5 is a logic diagram illustrating combinatorial logic which can be used to implement the register breakpointing of FIG. 3.

FIG. 5 illustrates in the form of logic gates a portion of the breakpoint circuitry 82 which can be used to implement the register breakpointing shown in the example embodiment of FIG. 3. It will be appreciated by those in this field that many other forms of this circuitry would be possible.

In broad terms the comparators 98 and 100 perform the comparisons of steps 66 and 68 of FIG. 3. The AND gates 102 and 104 in combination with the OR gate 106 provide the function corresponding to step 70 and step 72 of FIG. 3, namely ensuring that the register identifier matched, the access type matched and the mask was not in use before triggering the breakpoint response.

Also shown in FIG. 5 are three multi-bit AND gates 108, 110 and 112 which are respectively performing AND operations between various combinations of the mask value 46 an existing value for a register being accessed, a pattern value and a new value for a register being accessed. The outputs from these multi-bit AND gates 108, 110 and 112 are supplied in different combinations to multi-bit comparators 114, 116 and 118. Comparator 114 performs the comparison of step 78 of FIG. 3 and its result is selected by a multiplexer 120 in dependence upon a signal specifying that the access is a read (step 72 in FIG. 3). The comparator 116 performs the comparison of step 78 of FIG. 3 and has its result selected by a multiplexer 120 in dependence upon whether or not the pattern value is currently in use (step 76 of FIG. 3). Comparator 118 corresponds to step 80 of FIG. 3 and similarly has its value selected by multiplexer 122.

It will be appreciated that the hardware logic of FIG. 3 operates in parallel to perform the processing illustrated in sequence in FIG. 3. It will also be appreciated by those in this technical field that similar logic can be produced to correspond to the operation as illustrated in FIG. 4.

Although illustrative embodiments have been described in detail herein with reference to the accompanying drawings, it is to be understood that the invention is not limited to those example embodiments, and that various changes and modifications can be effected therein by one skilled in the art without departing from the scope and spirit of the appended claims.

We claim:

1. Apparatus for processing data, said apparatus comprising:
   one or more registers; and
   breakpoint circuitry responsive to detection of an access to at least one of said one or more registers to trigger a breakpoint response,
   wherein said breakpoint circuitry comprises one or more debug registers, said breakpoint circuitry being responsive to register access characterizing data held within respective debug registers to determine characteristics of accesses to a target register of said one or more registers that trigger said breakpoint response, and
   wherein said register access characterizing data comprises a mask value specifying one or more bits within said target register for which register accesses are monitored by said breakpoint circuitry.

2. Apparatus as claimed in claim 1, wherein said one or more registers include one or more general purpose registers storing data values to be manipulated.

3. Apparatus as claimed in claim 1, wherein said one or more registers include one or more control registers storing control values controlling configuration of said apparatus.

4. Apparatus as claimed in claim 1, wherein said register access characterizing data comprises an identifier of said target register for which register accesses are monitored by said breakpoint circuitry.

5. Apparatus as claimed in claim 1, wherein said register access characterizing data comprises an identifier of one or more types of access to said target register for which register accesses are monitored by said breakpoint circuitry.

6. Apparatus as claimed in claim 5, wherein said one or more types of access includes one or more of:
   a read access;
   a write access
   a reset; and
   any access.

7. Apparatus as claimed in claim 1, wherein said register access characterizing data comprises an identifier of a breakpoint handler for said target register for which register accesses are monitored by said breakpoint circuitry, said breakpoint handler being invoked when an access being monitored is made to said target register.

8. Apparatus as claimed in claim 7, wherein said identifier of a breakpoint handler specifies a memory address of breakpoint handling code to be invoked if said access being monitored is made to said target register.

9. Apparatus as claimed in claim 1, wherein said one or more debug registers include a mode bit controlling whether said debug register is used by said breakpoint circuitry to specify characteristics of an access to said target register to trigger said breakpoint response or characteristics of a memory access to trigger said breakpoint response.

10. Apparatus for processing data, said apparatus comprising:
    one or more input/output ports; and
    breakpoint circuitry responsive to detection of an access to at least one of said one or more input/output ports to trigger a breakpoint response,
    wherein said breakpoint circuitry comprises one or more debug registers, said breakpoint circuitry being responsive to input/output port access characterizing data held within respective debug registers to determine characteristics of accesses to a target input/output port of said one or more input/output ports that trigger said breakpoint response, and wherein said input/output port access characterizing data comprises a mask value specifying one or more bits within said target input/output port for which input/output port accesses are monitored by said breakpoint circuitry.

11. Apparatus as claimed in claim 10, wherein said input/output port access characterizing data comprises an identifier of said target input/output port for which input/output port accesses are monitored by said breakpoint circuitry.

12. Apparatus as claimed in claim 10, wherein said input/output port access characterizing data comprises an identifier of one or more types of access to said target input/output port for which input/output port accesses are monitored by said breakpoint circuitry.

13. Apparatus as claimed in claim 12, wherein said one or more types of access includes one or more of:
a read access;
a write access; and
any access.

14. Apparatus as claimed in claim 10, wherein said input/output port access characterizing data comprises an identifier of a breakpoint handler for said target input/output port for which input/output port accesses are monitored by said breakpoint circuitry, said breakpoint handler being invoked when an access being monitored is made to said target input/output port.

15. Apparatus as claimed in claim 14, wherein said identifier of a breakpoint handler specifies a memory address of breakpoint handling code to be invoked said access being monitored is made to said target input/output port.

16. Apparatus as claimed in claim 10, wherein said one or more debug registers include a mode bit controlling whether said debug register is used by said breakpoint circuitry to specify characteristics of an access to a said target input/output port to trigger said breakpoint response or characteristics of a memory access to trigger said breakpoint response.

17. Apparatus for processing data, said apparatus comprising:
one or more register means; and
breakpoint means for responding to detection of an access to at least one of said one or more register means to trigger a breakpoint response,
wherein said breakpoint means comprises one or more debug registers, said breakpoint means being responsive to register access characterizing data held within respective debug registers to determine characteristics of accesses to a target register of said one or more register means that trigger said breakpoint response, and
wherein said register access characterizing data comprises a mask value specifying one or more bits within said target register for which register accesses are monitored by said breakpoint means.

18. Apparatus for processing data, said apparatus comprising:
one or more input/output port means; and
breakpoint means for responding to detection of an access to at least one of said one or more input/output port means to trigger a breakpoint response,
wherein said breakpoint circuitry comprises one or more debug registers, said breakpoint circuitry being responsive to input/output port access characterizing data held within respective debug registers to determine characteristics of accesses to a target input/output port of said one or more input/output port means that trigger said breakpoint response, and wherein said input/output port access characterizing data comprises a mask value specifying one or more bits within said target input/output port for which input/output port accesses are monitored by said breakpoint means.

19. A method of triggering a breakpoint response within an apparatus for processing data having one or more registers, said method comprising the steps of:
detecting with breakpoint circuitry an access to at least one of said one or more registers;
in response to detecting said access, triggering said breakpoint response; and
storing register access characterizing data within respective debug registers of one or more debug registers of said breakpoint circuitry to determine characteristics of accesses to a target register of said one or more registers that trigger said breakpoint response,
wherein said register access characterizing data comprises a mask value specifying one or more bits within said target register for which register accesses are monitored by said breakpoint circuitry.

20. A method as claimed in claim 19, wherein said one or more registers include one or more general purpose registers storing data values to be manipulated.

21. A method as claimed in claim 19, wherein said one or more registers include one or more control registers storing control values controlling configuration of said apparatus for processing data.

22. A method as claimed in claim 19, wherein said register access characterizing data comprises an identifier of said target register for which register accesses are monitored by said breakpoint circuitry.

23. A method as claimed in claim 19, wherein said register access characterizing data comprises an identifier of one or more types of access to said target register for which register accesses are monitored by said breakpoint circuitry.

24. A method as claimed in claim 23, wherein said one or more types of access includes one or more of:
a read access;
a write access
a reset; and
any access.

25. A method as claimed in claim 19, wherein said register access characterizing data comprises an identifier of a breakpoint handler for said target register for which register accesses are monitored by said breakpoint circuitry, said breakpoint handler being invoked when an access being monitored is made to said target register.

26. A method as claimed in claim 25, wherein said identifier of a breakpoint handler specifies a memory address of breakpoint handling code to be invoked if said access being monitored is made to said target register.

27. A method as claimed in claim 19, wherein said one or more debug registers store a mode bit controlling whether said debug register is used by said breakpoint circuitry to specify characteristics of an access to said target register to trigger said breakpoint response or characteristics of a memory access to trigger said breakpoint response.

28. A method of triggering a breakpoint response within an apparatus for processing data having one or more input/output ports, said method comprising the steps of:
detecting with breakpoint circuitry an access to at least one of said one or more input/output ports; and in response to detecting said access, triggering said breakpoint response, storing input/output port access characterizing data within respective debug registers of one or more debug registers of said breakpoint circuitry to determine characteristics of accesses to a target input/output port of said one or more input/output ports that trigger said breakpoint response, wherein said input/output port access characterizing data comprises a mask value specifying one or more bits within said target input/output port for which input/output port accesses are monitored by said breakpoint circuitry.

29. A method as claimed in claim 28, wherein said input/output port access characterizing data comprises an identifier of said target input/output port for which input/output port accesses are monitored by said breakpoint circuitry.

30. A method as claimed in claim 28, wherein said input/output port access characterizing data comprises an identifier of one or more types of access to said target input/output port for which input/output port accesses are monitored by said breakpoint circuitry.

31. A method as claimed in claim 30, wherein said one or more types of access includes one or more of:
   a read access;
   a write access
   a reset; and
   any access.

32. A method as claimed in claim 28, wherein said input/output port access characterizing data comprises an identifier of a breakpoint handler for said target input/output port for which input/output port accesses are monitored by said breakpoint circuitry, said breakpoint handler being invoked when an access being monitored is made to said target input/output port.

33. A method as claimed in claim 32, wherein said identifier of a breakpoint handler specifies a memory address of breakpoint handling code to be invoked if said access being monitored is made to said target input/output port.

34. A method as claimed in claim 28, wherein said one or more debug registers store a mode bit controlling whether said debug register is used by said breakpoint circuitry to specify characteristics of an access to said target input/output port to trigger said breakpoint response or characteristics of a memory access to trigger said breakpoint response.

* * * * *